Oct. 8, 1929.   L. F. CARTER   1,730,967
TURNING ERROR PREVENTER FOR GYRO COMPASSES
Filed July 28, 1926   2 Sheets-Sheet 1
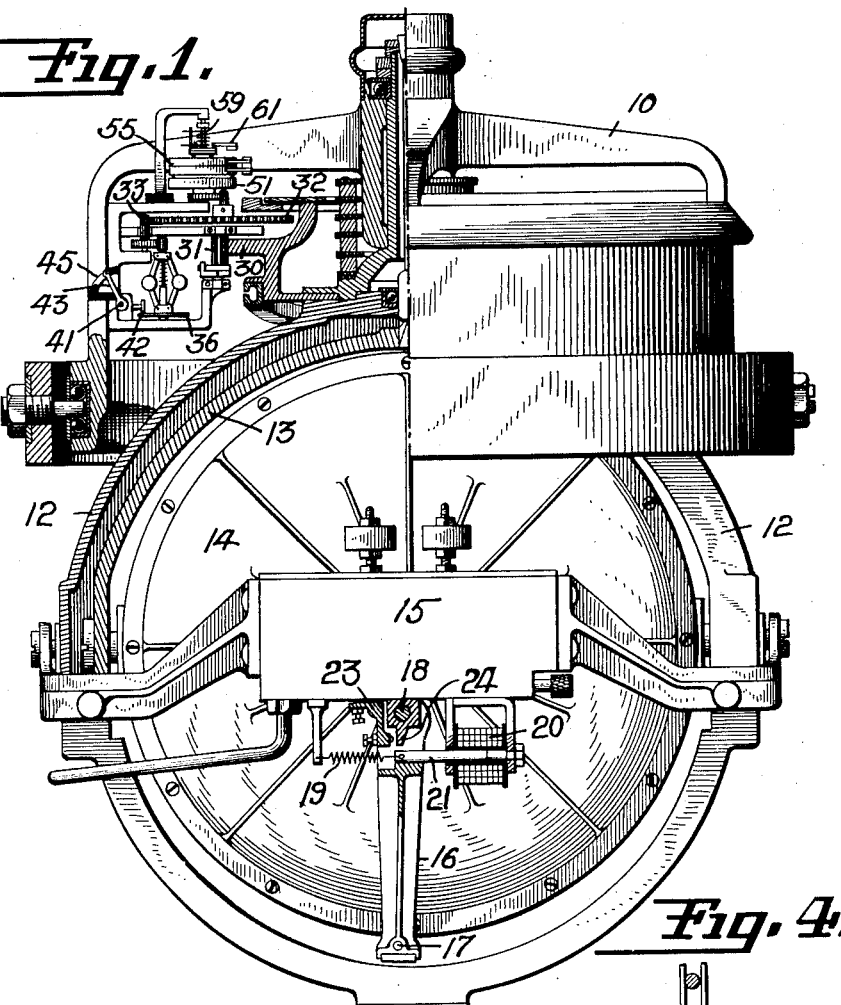
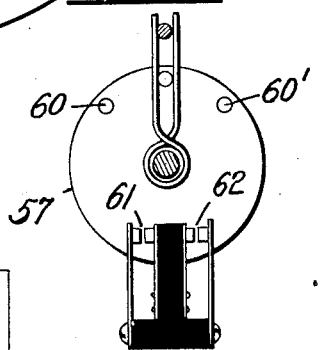
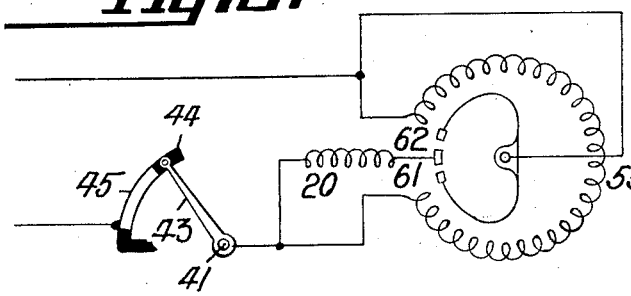
INVENTOR
Leslie F. Carter.
BY
Herbert H. Thompson
his ATTORNEY

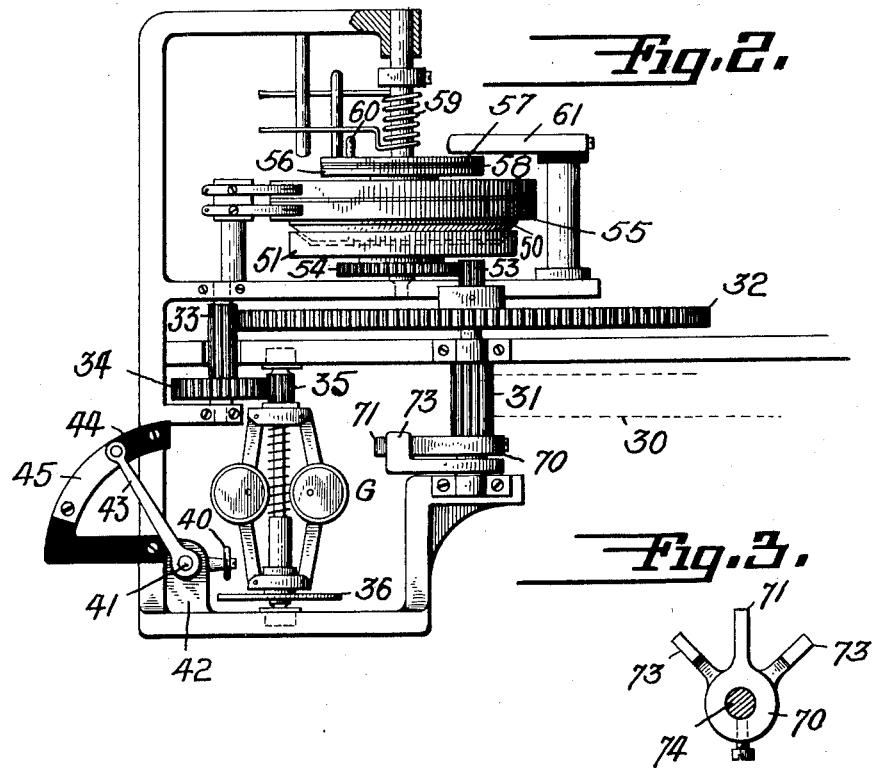

Patented Oct. 8, 1929

1,730,967

UNITED STATES PATENT OFFICE

LESLIE F. CARTER, OF LEONIA, NEW JERSEY, ASSIGNOR, BY MESNE ASSIGNMENTS, TO SPERRY GYROSCOPE COMPANY, INC., A CORPORATION OF NEW YORK

TURNING ERROR PREVENTER FOR GYROCOMPASSES

Application filed July 28, 1926. Serial No. 125,383.

This invention relates to gyroscopic compasses in which means are employed to eliminate or otherwise compensate for or prevent the error due to the damping factor of the compass when the ship changes its speed or course. The said damping factor gives rise to appreciable error only when the ship changes its course at a rate in excess of a certain predetermined rate of change, and further, only when the ship changes at said rate through a predetermined angular distance. For example, when the rate of turn is less than 1° in five seconds, the damping error is inappreciable and may be disregarded. Also, when the rate of turn, even though it be relatively great, does not continue for sufficient time to cause the ship to turn through a substantial angular distance, for example 15°, the error introduced by the damping means is also negligible. It is the principal object of my invention, therefore, to provide means for eliminating the damping error in gyroscopic compasses when the said error would be appreciable, that is to say, when the rate of turn of the ship is equal to or exceeds a predetermined rate and when the said rate of turn is maintained for a sufficient time to turn the craft through an angular distance equal to or exceeding a predetermined angular distance.

My invention has broad application to various types of damping means employed on gyroscopic compasses and I have illustrated said invention in connection with a compass of the Sperry liquid controlled type in which the damping factor is altered by a variation in the position of the point of connection of the arm joining the liquid gravitation factor with the compass, and also in connection with the type of damping control shown in the patent to M. Schuler #1,186,686 granted June 13, 1916, wherein the flow of liquid between two containers is adapted to be out of phase with the oscillations of the compass.

Other objects and advantages of this invention will become apparent in the following detailed description thereof:

In the accompanying drawings

Fig. 1 is an elevation of the south end of a Sperry compass, looking north, with parts shown in section.

Fig. 2 is an enlarged detail view of the damping control means shown in Fig. 1.

Fig. 3 is a plan view of a means for actuation of the damping control means when the turn of the craft exceeds a certain predetermined angle.

Fig. 4 is a plan view of the contact system for controlling the damping eliminating means.

Fig. 5 is a wiring diagram of the electrical system utilized in the damping control means.

Fig. 6 is a front view, partly sectioned vertically, illustrating my invention as applied to a different form of damping means.

Referring to the drawings, I have illustrated in Fig. 1 my invention as applied to the Sperry gyro compass. Said compass comprises the usual supporting spider 10 which supports for turning about a vertical axis the follow-up support 12, within which is mounted the vertical ring 13 and the gyro casing 14. Pivoted on the follow-up support 12 is the liquid control system 15 having an arm 16 connecting the same to the bottom of the gyro case at 17, which point is normally slightly eccentric to the vertical line passing through the center of the case, the degree of eccentricity in this case being equal to the angle $e$. Said arm 16 is pivoted at 18 on the box 15 and is automatically moved so as to cause the point of connection 17 to lie in the vertical line under the center of gravity of the gyro casing when the ship turns at a given rate of speed and through a predetermined angle. The said turning movement may be accomplished by energizing an electro-magnet 20 having a core 21 rigidly connected to the arm 16 to swing said arm about pivot 18. A spring 19 may be interposed between arm 16 and casing 15 to maintain the pivot normally in eccentric position. For stopping the arm 16 when pivotal connecting 17 is in the vertical axis of the gyro case and also in the eccentric position, I may provide a suitable double stop member 23 integral with the arm and engageable with a stop 24 carried by the casing and with the casing proper, respectively.

These two factors, first, rate of turn and, second, total angular distance, are caused to control the energization of electro-magnet 20 by the following construction. The usual azimuth gear 30, carried by the follow-up element 12 of the compass, is geared through multiplying gearing, such as 31 to 35 inclusive, to a governor G to whose movable element there is fixed a plate 36. By this construction it will be seen that even small turning movements of the gyro compass will cause rapid rotation of the governor G, which will cause plate 36 to move axially, that is, to rise (in Fig. 1). In the path of the upward movement of plate 36 there is interposed a roller 40 which may be at one end of a bell crank 41 pivoted on a fixed bracket at 42, the other arm of said bell crank carrying a contact arm 43, which normally engages an insulated portion 44 but which is adapted to be moved into engagement with a contact segment 45 when the said bell crank is rocked, due to engagement of plate 36 with roller 40. A clearance is provided between plate 36 in its unactuated position and the normal position of roller 40, as shown in Fig. 2, so that plate 36 must travel through a predetermined distance, that is to say, the ship must turn at a predetermined rate before plate 36 will engage roller 40 to cause contact arm 43 to engage contact 45. This clearance may be varied at will so that the damping eliminator will not be affected unless the ship turns through any desired or predetermined rate of speed.

By my invention electro-magnet 20 is not energized merely by engagement of contact arm 43 with contact 45, that is to say, not merely when the ship turns at a given rate of speed, but requires for its energization also that the ship turn through a predetermined angular distance. For this purpose the engagement of contacts 43 and 45 is caused to energize an electro-magnetic member 55 of a clutch 50 to attract and engage the other member 51 thereof. Member 51 is normally driven from the azimuth gear as through gearing 32, 53, 54, while the other part 55 of said clutch is normally stationary and separated from part 51 by a centralizing spring (not shown). The clutch 50 being energized, part 55 of the clutch is attracted to part 51 to rotate a disc 56 carried by part 55 and thus rotate a disc 57 in slip-frictional engagement with disc 56 through a connection such as leather washer 58. Disc 57 is thus rotated against the action of a centralizing spring 59 to cause one of the other of two projections or studs 60, 60' (depending upon the direction of turning) to engage and close one or the other of the sets of contacts 61 or 62, provided the turning of the ship continues through a predetermined angular distance. If turning continues beyond the predetermined angular distance, slipping will occur in the said slip-friction connection. Either of said sets of contacts upon closing are adapted to energize electro-magnet 20 to turn arm 16 until connection 17 is in the vertical plane of the gyro casing, that is, to eliminate the damping element of the compass.

From the above description it will be seen that it is necessary for the ship to turn through a given angular distance and at a given rate of turn before the damping means can be eliminated. If, before projection 60, 60' has closed the sets of contacts 61 or 62, that is to say, before the ship has turned through a predetermined angular distance, the rate of turn should drop so that plate 36 moves out of contact with roller 40 and contact 43 moves out of engagement with contact 45, then clutch 50 will be deenergized and centralizing spring 56 will restore disc 57 and projections 60, 60' to initial position. Similarly, if contact 43 remains in engagement with contact 45, that is, if the ship is turning at the predetermined rate of speed or at a greater speed, if turning is stopped before the ship has turned through the said predetermined angular distance, then likewise electro-magnet 20 will not be energized because projections 60, 61 will not have engaged and closed contacts 61 or 62. So that both factors are necessary for energizing magnet 20, first, rate of turn equal to or in excess of a predetermined rate, and second, total angular distance of turn equal to or in excess of a predetermined angular distance.

In order that the ordinary hunting oscillations of the compass and also small turning movements of the ship, such as those due to small yaws, shall not be transmitted to the damping control means, I may interpose a suitable lost-motion connection in the drive from the compass to the control means. This connection may be as shown in Fig. 3 wherein gear 31 has fixed thereto a collar 70 having a projection 71 operating between spaced projections 73 fixed to a shaft 74. Said shaft carries gear 32 at its other end to operate the gear train to the governor. From this construction it will be obvious that the hunting oscillations of the compass and small movements of the ship will not be transmitted to the damping control means. The degree of lost-motion may, of course, be predetermined by properly spacing projections 73 with respect to projection 71.

My invention, as hereinbefore pointed out, has general application to other types of error preventing devices and other types of damping means. For instance the type of liquid damping control wherein fluid flows from one container to another out of phase with the oscillations of the gyroscope. Such a form of damping is disclosed in Fig. 6 wherein the tube $r$ may be the tube $r$ of patent to Schuler #1,186,686. Intermediate the length of said tube, I may provide a valve of any suitable type, such as the gate valve 70, which may be carried at one end of a stem 71' adapted to be actuated by electro-magnet 20. The said magnet may be controlled by the same factors and the same means as in the Figs. 1 and 2 form of the device so that when the ship has turned at a predetermined rate and through a predetermined angular distance, valve 70 is actuated by electro-magnet 20 to cut off communication between the two parts of tube $r$ and thus prevent damping during the continuation of such turning movement.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In combination, a gyro compass for use on a vehicle and having damping means, means for preventing the error which would otherwise be introduced by said damping means on turning of said vehicle, means responsive to degree of turning of said vehicle, and means whereby said second means is brought into action only after a predetermined degree of actuation of said degree responsive means.

2. In combination, a gyro compass for use on a vehicle and having damping means, means for preventing error which would otherwise be introduced by said damping means on turning of said vehicle, means responsive to rate of turning of said vehicle, means responsive to degree of turning of said vehicle, and means whereby said second means is controlled by said rate responsive means and said degree responsive means.

3. In a gyro compass for use on a vehicle and having damping means, means for preventing error which would otherwise be introduced by said damping means on turning of the vehicle, and means whereby said second means is controlled by the rate of change of course, said last-named means including a speed responsive device and means whereby said device is actuated from said compass.

4. In a gyro compass having damping means, means for rendering said damping means ineffective, and means whereby said second means is controlled by the rate of change of course, said last-named means including a speed responsive device and means including multiplying gearing whereby said device is actuated from said compass.

5. In a gyro compass for use on a vehicle and having damping means, means for preventing error which would otherwise be introduced by said damping means on turning of the vehicle, and means whereby said second means is controlled by the degree of total change of course, said last-named means including a device actuated in accordance with the angular movements of said compass beyond a predetermined initial angular movement.

6. In a gyro compass for use on a vehicle and having damping means, means for preventing error which would otherwise be introduced by said damping means on turning of the vehicle, and means for bringing into action said last-named means when the rate of change of course is above a predetermined rate, said last-named means including a pair of contacts, a speed responsive device, means whereby said device is actuated from said compass, and means whereby said device controls one of said contacts.

7. In a gyro compass for use on a vehicle and having damping means, means for preventing error which would otherwise be introduced by said damping means on turning of the vehicle, and means for bringing into action said last-named means when the total change of course is more than a predetermined angular distance, said last-named means including a pair of contacts, a device actuated in accordance with the angular movements of said compass, and means whereby said device controls one of said contacts.

8. In a gyro compass for use on a vehicle having damping means, means for preventing the error which would otherwise be introduced by said damping means on turning of the vehicle, and means whereby said second means is controlled by the rate of change of course and the degree of change of course, said controlling means including a speed-responsive device actuated from said compass, a device actuated in accordance with angular movements of said compass, a device responsive to angular movement greater than a predetermined amount, means normally ineffective whereby said compass actuates said angular movement responsive device, and means whereby said speed responsive device controls said normally ineffective means.

9. In a gyro compass for use on a vehicle and having damping means, means for preventing error which would otherwise be introduced by said damping means on turning of the vehicle, and means whereby said second-mentioned means is controlled by the rate of change of course and the total change of course, said controlling means including a speed responsive device actuated from said compass, a device responsive to angular movement greater than a predetermined amount, means including an electro-magnetic clutch normally ineffective whereby said compass actuates said angular movement responsive device, and means whereby said speed responsive device, when actuated to a predetermined degree, energizes said clutch.

10. In a gyro compass for use on a vehicle and having damping means, means for preventing error which would otherwise be introduced by said damping means on turning of the vehicle, and means for actuating said last-named means when the total change of course exceeds a predetermined amount, said last-named means including a pair of contacts, an angular movement responsive device, means including a slip friction connection between said compass and said device whereby said device is actuated from said compass, and means whereby said device controls one of said contacts.

11. In a gyro compass for use on a vehicle and having damping means, means for preventing error which would otherwise be introduced by said damping means on turning of the vehicle, and means whereby said last-named means is controlled by the rate of change of course and the degree of change of course, said last-named means including a pair of contacts, an angular movement responsive device, means including an electro-magnetic clutch whereby said device is actuated from said compass, means whereby said device controls one of said contacts, and means for energizing said clutch, including a pair of contacts, a speed responsive device, means whereby said spaced responsive device is actuated by said compass in accordance with the speed of angular movement thereof, and means whereby said speed responsive device controls one of said last-named contacts.

12. In a gyro compass for dirigible craft, said compass having damping means, means for preventing the error which would otherwise be introduced by said damping means upon turning of the craft, and means including a lost motion connection whereby said compass actuates said second means.

13. In a gyro compass for dirigible craft, said compass having damping means, means for preventing the error which would otherwise be introduced by said damping means upon turning of the craft, and means including a plurality of successive lost motion connections between said compass and said second means for actuating said second means for all turning movements of the compass above a predetermined degree.

14. In combination with a gyro compass for a dirigible craft, said compass having damping means, means for preventing the damping error due to turning of the craft, said last-named means including an actuating member for bringing said preventing means into action, and means actuated by a predetermined degree of turning of said compass for operating said member.

In testimony whereof I have affixed my signature.

LESLIE F. CARTER.